Figure 1:
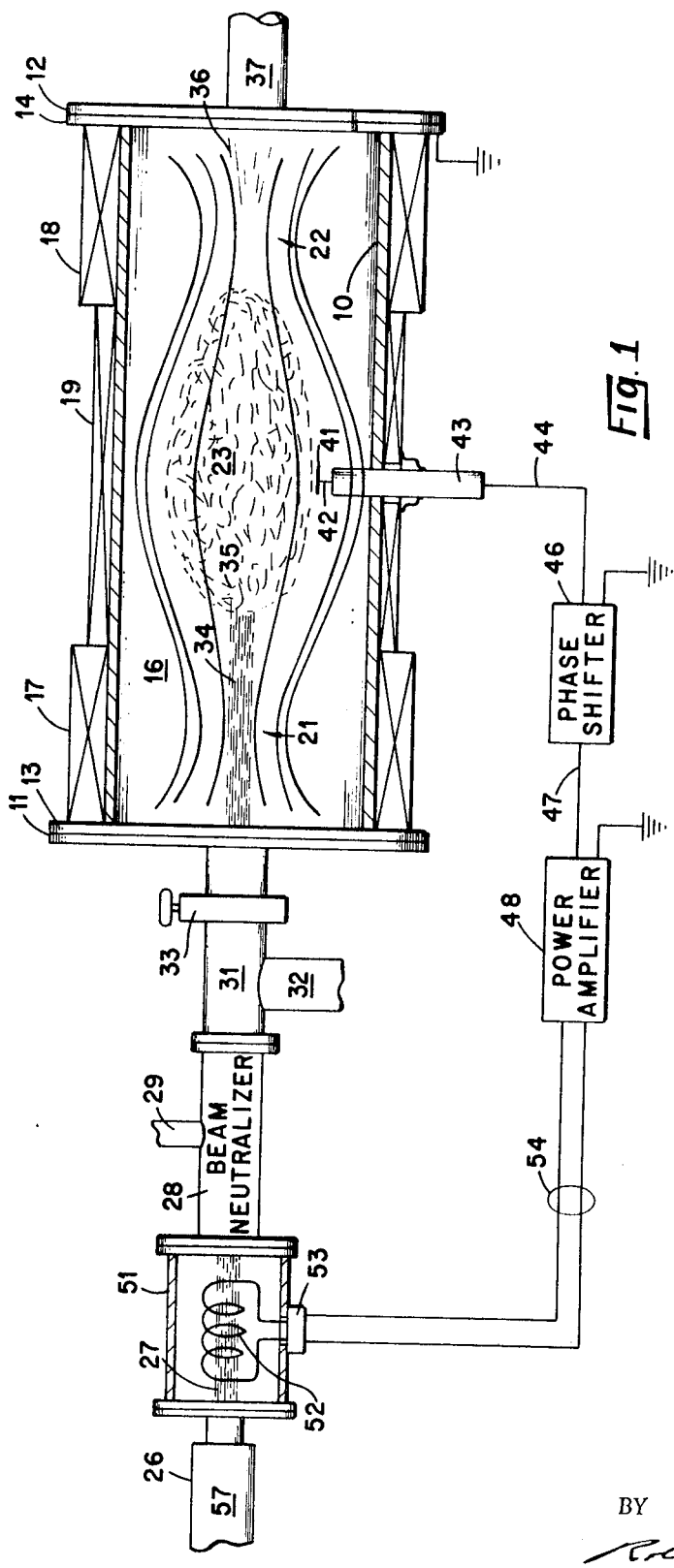

United States Patent [11] 3,624,240

[72] Inventors Charles C. Damm
 Alamo;
 Richard F. Post, Walnut Creek, both of Calif.
[21] Appl. No. 22,294
[22] Filed Mar. 24, 1970
[45] Patented Nov. 30, 1971
[73] Assignee The United States of America as represented by the United States Atomic Energy Commission

[54] FEEDBACK STABILIZATION OF A MAGNETICALLY CONFINED PLASMA
 10 Claims, 2 Drawing Figs.
[52] U.S. Cl. ..................................................... 176/7, 315/111, 313/161
[51] Int. Cl. ........................................................ G21b 1/00
[50] Field of Search ........................................... 176/1-9; 315/311; 313/161

[56] References Cited
UNITED STATES PATENTS
3,031,399 4/1962 Warnecke et al. ............ 176/2
3,257,284 6/1966 Post ............................... 176/5
3,518,424 6/1970 Wanless et al. ................ 250/83.3 X Primary Examiner—Reuben Epstein
Attorney—Roland A. Anderson ABSTRACT: A high-temperature plasma is produced by the injection and trapping of energetic particles in a magnetic field containment zone. Detectors are arranged proximate to the plasma to detect electrostatic or electromagnetic signals produced by instabilities in the plasma containment system. The detected signals are amplified and shifted in phase either positively or negatively with respect to the instability oscillation and are then utilized to modulate an energetic particle beam which is then directed into the plasma containment zone wherein the modulation component of the injected beam interacts with the plasma to minimize or eliminate the instability oscillation of the plasma. Stable containment of the plasma is thereby promoted.

PATENTED NOV 30 1971 3,624,240

INVENTORS.
Charles C. Damm
Richard F. Post
BY
*Roland A. Anderson*
ATTORNEY.

FEEDBACK STABILIZATION OF A MAGNETICALLY CONFINED PLASMA

BACKGROUND OF THE INVENTION

The invention described herein was conceived, or made, under Contract NO. W-7405-ENG-48 with the United States Atomic Energy Commission.

A variety of technological fields are concerned with the production of high temperature gases or plasmas produced and contained in magnetic containment zones having a wide variety of configurations. For example, the configurations may be toroidal, cylindrical or generally spherical. Such configurations are typified, in the controlled fusion or controlled thermonuclear reactor art by so-called stellarator, Astron, Magnetic Mirror, Levitron, ALICE, Baseball or Tennis Ball Seam and other types of machines or devices.

It is well known that the times of containment, plasma density, temperatures of the plasma and combinations thereof which are attainable, in practice, are usually limited by the onset of so-called "instabiliities", i.e., disruptive oscillations of the plasma. These instabilities may lead to a sudden loss or to an accelerated loss of plasma from the containment zone far in excess of that predicted by classical diffusion theory.

The occurrence of such instabilities has accordingly proven to be a serious obstacle in obtaining plasmas containing fusionable light isotope ions at densities and temperatures and for periods of time sufficient to yield high and/or sustained thermonuclear reaction rates, e.g., such as may be employed in power producing controlled fusion reactors.

Various approaches have been utilized in attempting to eliminate or minimize the occurrence of instabilities in such magnetically contained plasmas such as employing magnetic fields with favorable line curvatures, minimum-B configurations, stringently controlled operating parameters and the like. One method wherein higher atomic weight plasma particle additives are injected into the plasma containment zone to effect particle orbit stabilization of the plasma is disclosed in U.S. Pat. No. 3,257,284, issued June 21, 1966 to Richard F. Post. General information relating to plasma instability is also disclosed in said patent. See also, "Cooperative Oscillations in a High-Temperature Plasma Formed by Neutral Atom Injection," R. F. Post et al., pp. 323-326, Vol. 10, No. 8, Physical Review Letters, Apr. 15, 1963. Also "Observations of Plasma Instability with Rotational Effects in a Mirror Machine," W. A. Perkins and R. F. Post, pp. 1537-1558, Vol. 6, No. 11, "Physics of Fluids," Nov. 1963. More recent literature is replete with reports of experimentation and theoretical discussion directed to the problem of controlling or eliminating instabilities from high temperature plasma magnetic containment systems.

SUMMARY OF THE INVENTION

The present invention relates generally to the production of high temperature plasmas and, more particularly, to the control or elimination of instabilities from systems in which a high temperature plasma is produced and confined in a magnetically defined zone.

Controlled fusion or controlled thermonuclear reactors with which the present invention may be practiced are those which include means for producing a magnetic field in an evacuated region, said magnetic field having a configuration defining a zone in which charged particles, i.e., a thermonuclear plasma, may be contained. Such reactors also include a means for disposing or creating a high temperature plasma including fusionable light isotope ions therein. Such light isotopes will generally comprise one or more materials such as one of the heavier hydrogen isotopes, i.e., deuterium alone or in admixture with tritium, helium 3 and possibly lithium which undergo fusion reactions under appropriate conditions of time, density and temperature.

The plasma may be formed by directing high energy particle beams such as energetic molecular ion or neutral particle beams into the field to be ionized by collisions, Lorentz force mechanisms, etc., yielding ionic particles of higher charge to mass ratios which are trapped in the containment zone together with neutralizing electrons. Plasma may also be formed by directing energetic charged particles into the magnetic field and manipulating the field, e.g., by increasing magnetic field strength, so as to trap the particles. Plasma may also be formed, in situ, e.g., by interaction of a neutral gas with energetic charged particles to ionize and heat the particles in the containment zone. In general, in producing such plasma, energetic atomic or molecular particles, as well as energetic charged molecular, atomic or electron particles, may be injected in the course of forming such a plasma. The onset of instability may occur early in the formation of the plasma, i.e., during plasma density buildup to pose a serious or insurmountable obstacle to attaining desired density and/or period of containment. Instabilities may also occur at later times to cause serious or total plasma loss so that adequate containment times at a sustained reaction rate cannot be achieved, for example, in a controlled fusion reactor.

It is contemplated that the invention may generally be utilized with any system in which a high temperature plasma is confined in a containment zone defined by a magnetic field. Moreover, it is contemplated that the teachings of the invention may be utilized for controlling a wide variety of instabilities. While a large number of apparently different types of instabilities have been considered theoretically and/or observed experimentally, as reported in the literature, it may be observed that a large proportion, if not all, have a common characteristic which may be utilized to effect control. This common characteristic is related to the circumstance that localized oscillatory changes in the density and/or position of localized portions of the plasma are associated with the occurrence of the instability. When the instability attains a sufficient amplitude the plasma may locally penetrate the field or the plasma otherwise may escape from the containment zone. Therefore, dependent on the stage at which plasma loss occurs, an adequate density, temperature or time of containment cannot be achieved.

The characteristic oscillatory changes of plasma and/or position of the plasma produce electromagnetic and electrostatic effects which may be detected utilizing one or more electromagnetic, i.e., a pickup coil, detector probes or an electrostatic pickup detector probe mounted in proximity to the plasma boundary. The detector probes yield a signal that is correlated with the frequency and amplitude of the instability.

For purposes of the invention the detected signal is amplified and shifted in phase and is then employed as a feedback signal or power source to modulate an energetic particle beam. The modulated energetic particle beam is then directed into the plasma containment zone generally to be trapped and contained therein as a plasma. The energetic charged particle beam which is modulated may be derived from a source ordinarily employed to form the plasma, i.e., as an ion or plasma source or a separate source may be employed particularly in a case where the reactor or device does not ordinarily employ an energetic particle beam source in producing the contained plasma. In the latter case an electron beam source may be used in the same manner. An energetic particle beam source generally includes an ion source in which extracting electrodes draw energetic charged particles from, e.g., an arc plasma region and may include additional accelerating electrodes and focusing electrodes or magnetic focusing means for obtaining an energetic charged particle beam. Such an energetic charged particle beam source may be employed to direct charged particles directly into a magnetic field plasma containment system. However, for many applications the energetic charged particles are passed through a neutralizer cell wherein the ions interact with a gaseous medium and acquire an electron becoming an energetic neutral particle which is then directed into the plasma containment zone to be ionized and trapped therein to form or augment the plasma density. Energetic molecular ions may also be produced by similar means well known in the art to be injected and trapped in the plasma containment zone. With any such energetic particle beam source, the amplified feedback signal shifted in phase may be applied, for example, to an accelerating or extraction electrode therein to yield a particle beam current modulated in amplitude and/or energy with a frequency component corresponding to the feedback signal. Alternatively, the feedback signal may be directed through a modulation coil disposed coaxially about a portion of the charged particle beam path, in such an energetic particle source, to modulate the charged particle beam current. It will be appreciated that the modulated component will be retained subsequent to neutralization so that modulation will be present in the energetic particle beam whether the beam is composed of charged particles, energetic neutrals or energetic molecular ions.

The energetic particle beam may comprise particles of fusionable atomic species, i.e., ions, molecular ions or neutral particles particularly when a fusion plasma is to be stabilized, e.g., $D^+$, $T^+$, $He_3^+$, $DH^+$, $DT^+$, D, $D_2$, DT, etc. The beam might also comprise energetic hydrogen ions, molecular ions or neutral particles, i.e., $H^+$, $H_2^+$, or H and/or electrons. With plasmas intended for purposes other than fusion, the energetic particles may comprise other atomic species and electrons compatible with such a plasma and the use intended.

Upon entry and trapping of the energetic particle beam in the plasma containment zone, the modulation component energy of the beam is communicated to the plasma in such a manner that oscillations are induced in the contained plasma. The frequency and amplitude of the induced oscillations are, of course, correlated to those of the modulation beam component and in the absence of the described phase shift means could tend to be regenerative so as to reinforce the original plasma instability. However, in accord with the concept of the invention said phase shifter may be adjusted or arranged to cause the modulation component to be negatively out of phase with the instability so that the amplitude of the instability is opposed and thereby minimized or eliminated. In a somewhat similar fashion the phase shift may be made positively out of phase thereby causing the plasma oscillations or instability to be displaced in a manner in which the destructive instability mode is diminished or eliminated. It is contemplated that in-phase regeneration could also be used to eliminate a destructive instability, for example, by selecting and reinforcing a stable oscillation mode to predominate over an unstable or destructive oscillatory mode.

As employed herein the terminology destructive or unstable oscillation or instability mode is intended to indicate a mode in which the oscillation or instability continues to grow in amplitude to a level at which the plasma is allowed or is caused to penetrate the magnetic containment field and be lost. A stable mode may be represented by a quiescent plasma or by a plasma with an oscillatory mode or amplitude of oscillation at which the plasma penetrates the containment field much more slowly, i.e., at times approaching the classical diffusion rate.

Accordingly, it is a general object of the invention to provide for the improved confinement of a high temperature plasma in a magnetic containment field.

Another object of the invention is to provide for the stabilization of a magnetically contained plasma by detecting plasma oscillations or instabilities and utilizing the detected signal to apply a modulation component to a beam of energetic particles which is directed into the containment zone in such a manner that the modulation component of the beam stabilizes the plasma containment.

Still another object of the invention is to provide for the stabilization of a magnetically contained high temperature plasma by utilizing at least one detector to produce a signal indicative of the plasma instability, shifting the phase of the detected signal and utilizing the phase shifted signal to modulate an energetic particle beam which is directed into the plasma containment field.

Figure 2:
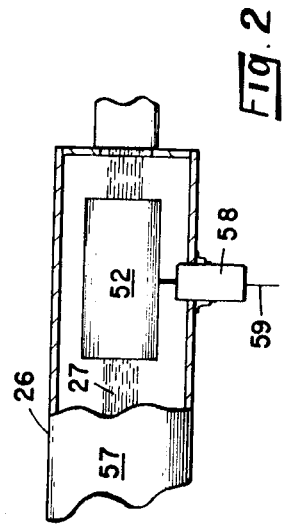

Other objects and advantageous features of the invention will be apparent in the following description and accompanying drawing in which:

FIG. 1 is a schematic representation of apparatus arranged in accordance with the invention and employing an electromagnetic beam modulator; and FIG. 2 is an illustration of an ion source as shown in FIG. 1 which is modified to permit electrostatic modulation of the ion beam.

As noted above the teachings of the invention may be employed for the stabilization of plasma containment in substantially any controlled fusion or thermonuclear reactor particularly where extended periods of containment are desired. Among the suitable types of reactors are those having linear, toroidal and generally spheroidal magnetic field configurations, e.g., Magnetic Mirror, Stellarator, Levitron, Baseball Seam and other types of reactors. Typical practice of the invention will be described with reference to an "ALICE" type magnetic mirror reactor described, inter alia, in "Plasma Physics and Thermonuclear Research," pp. 55, et. seq., Volume 2, Progress in Nuclear Energy, Series XI, Pergamon Press, 1963.

Such an ALICE reactor, as illustrated in FIG. 1 of the drawing, generally includes a magnetically permeable metallic cylindrical vacuum vessel section 10 closed by end cover plates 11, 12, attached to flanges 13, 14, respectively, thereon and defining a chamber 16 therein. A solenoid having terminal portions 17, 18 of a relatively high ampere turns/unit length characteristic and usually with a linear central portion 19 of a uniform relatively lower ampere turns/unit length characteristic is disposed circumjacent vessel section 10. When energized with direct current from a supply (not shown) the solenoid produces an axially symmetric magnetic field having intensified terminal regions 21, 22 and a central reduced intensity region therebetween defining a magnetic mirror charged particle containment zone 23 within chamber 16. The reactor also includes a means for directing a beam of energetic neutral particles into said containment zone. Such a means generally includes an ion source 26 which produces a beam 27 of energetic ions, e.g., $H^+$, $D^+$, $T^+$, $He_3^+$, etc. The ion source 26 may be of the Duo Plasmatron type described in aforesaid "Plasma Physics and Thermonuclear Research" reference, cited above, or an equivalent device. In accord with usual practice the ion beam is directed through a gas cell neutralizer 28 such as those disclosed in U.S. Pat. No. 3,152,959, issued Oct. 13, 1964 to Charles C. Damm. Therein the energetic ions undergo charge exchange with a gaseous medium introduced through a conduit 29 and are converted into energetic neutral particles, i.e., H, D, T, $He^3$, etc. The energetic neutral particles emergent from the neutralizer are directed through beam tube section 31 connected to an axial port in cover plate 11. Conduit section 31 is evacuated by means of at least one vacuum pump (not shown) connected to a conduit sidearm 32 of beam tube 31. Neutralizing medium and other extraneous materials are removed by said pump to establish an appropriate differential vacuum pressure, e.g., $10^{-6}$ mm. Hg. or lower, in the beam tube. A vacuum gate valve 33 may be disposed in the beam tube 31 for closing off the beam source.

The energetic neutral particles emerge from beam tube 31 as a collimated beam 34 which may be directed axially through magnetic mirror region 21 into containment zone 23. The energetic neutral particles may be ionized by collision with residual gas particles therein to form energetic ions which are trapped with electrons to form high temperature plasma 35 confined in containment zone 23. It will be appreciated that the energetic neutral particle beam may also be directed angularly or transversely into the containment zone and that ionization can be effected by Lorentz force particularly if the energetic neutrals are in an excited quantum state.

In usual practice, residual portions 36 of the energetic ion beam 34 which traverse the containment zone 23 are directed through a conduit 37 connected to an axial port in end cover plate 12. Vacuum pumping equipment (not shown) and beam dumping or disposal means (not shown) may be connected to conduit 37 to evacuate extraneous material from chamber 16 and to dispose of residual beam particles. Such vacuum pumping equipment together with other pumps (not shown) connected, if necessary, to the vessel evacuate chamber 16 to below about $10^{-6}$ mm. Hg or preferably below about $10^{-8}$ to $10^{-10}$ mm. Hg.

For adapting a controlled fusion reactor, of the character described for operation in accord with the invention, at least one probe means is disposed in chamber 16 in a position of the plasma attendant to a plasma instability or plasma oscillation. For example, at least one electrostatic probe may be so employed. Such probe may comprise a disk electrode 41 supported in spaced proximity to a radial boundary of plasma 35, e.g., by means of central conductor rod 42 of a standoff insulator 43 leading in sealed relation through vessel section 10. The positioning of such a probe would be characteristic of those to be used with toroidal or cylindrical magnetic containment field geometries and represents a positioning of the electrode in a locale of unfavorable field line curvature, i.e., concave toward the plasma at which plasma penetration of the magnetic field and loss of the plasma due to instability is most likely. With spheroidal or other geometries, similar criteria may be used for appropriately positioning the probe means. A comparable electromagnetic probe may be provided by substituting a small insulated conductor coil (not shown) for the disk electrode 41. Probes of the foregoing types are described in "Controlled Thermonuclear Reactions," Glasstone Lovberg, D. Van Nostrand Co., Inc., Sections 6.82–6.125.

In any event, such a probe delivers an electrical signal indicative of the frequency and amplitude of an instability oscillation to conductor 44. The frequency of an instability oscillation may range from about a few cycles per second up to the harmonies of the ion cyclotron frequency of plasma particles in the magnetic field, i.e., up to about 10 megacycles/second. Typical low frequency oscillation would lie in the range of about 10 cycles to 100 kilocycles while high frequency modes would lie in a range of about 100 kilocycles to 10 megacycles. The signal from conductor 44 is fed into a phase shifter 46, wherein the signal may be amplified if necessary and the phase of the instability signal is generally shifted either to lead or to lag in phase relation with respect to the phasing of the instability oscillation. For maximum feedback control the phase shift should be of the order of 180° in either a leading or lagging relation. However, effective phasing may be obtained with a phase shift effectively of the order of about 45° to about 315°. While it is generally preferred to employ a phase shift in the detected signal for generating effectively degenerative feedback power utilized, as described hereinafter, to control an instability, an in-phase signal might be used regeneratively, for example, to reinforce a stable oscillation mode to predominate over and thereby exclude an unstable mode of oscillation. An appropriate filter network (not shown) or the like may be utilized to select the desired regenerative signal as well as to assure selection of a desired instability signal when necessary.

The degenerative phase shifted signal or the regenerative signal of selected frequency is fed by means of conductor 47 into a power amplifier 48. The amplified signal therefrom is then employed to modulate the ion beam 27 produced by source 26. An electromagnetic means for modulating the ion beam is illustrated in FIG. 1. A flanged beam tube section 51 is disposed between ion source 26 and neutralizer 28 so that ion beam passes therethrough. A solenoidal coupling coil 52 is supported circumjacent ion beam 27 as by means of a feedthrough standoff insulator 53 mounted in sealed relation on beam tube section 51. The modulation current from amplifier 48 is delivered to coil 52 by means of a paired transmission line 54 and thereby impress a modulation envelope on the ion beam 27 which is preserved in the energetic neutral particle beam 34 during passage through the neutralizer 28. The modulated component of energy is transferred to the plasma 35 when the energetic neutral particles are trapped in containment zone 23 wherein a degenerative effect is induced effective to decrease the amplitude of a destructive instability. A regenerative effect is produced in the second case so as to cause a stable oscillation mode to predominate to the exclusion of an unstable mode.

Electrostatic means may also be employed to modulate ion beam 27. In this case the electromagnetic modulation means shown in FIG. 1 is omitted and the ion source 26 may be modified as shown in FIG. 2. More particularly, a cylindrical tubular electrode 52 may be mounted concentrically about the path of ion beam 27 within the exterior tubular casing 57 of such ion source 26 as by means of feedthrough standoff insulator 58 supported in sealed relation by casing 57. The central conductor 59 of standoff insulator 58 is then connected to one leg of transmission line 54 and the other leg of transmission line 54 is connected to a suitable reference voltage point of ion source 26, not shown. Application of the modulation power from amplifier 48 then electrostatically impressed the feedback modulation to ion beam 27 and the ion beam thenceforth behaves as described above. It would, of course, be possible to arrange the electrostatic modulation electrode as in the case of the electromagnetic unit. Moreover, the modulation power might also be superimposed on the accelerating voltage applied to an extractor or acceleration electrode already existent in the ion source.

It may be noted that controlled fusion reactors utilize magnetic fields ranging from a few hundred gauss, for laboratory devices, to above about 200 kilogauss in intensity for power producing designs. Ion beam energies may range from as low as 1 KEV. to above about 100 KEV. Laboratory devices may be operated with charged particle (plasma) densities as low as $10^7$ particles/cc. However, significant neutron and power production generally require densities of the order of $10^{12}$ to above about $10^{16}$ particles/cc., i.e., $D^+$, $T^+$, $He^{3+}$ and mixtures thereof with containment times of the order of at least 0.1 second and at temperatures ranging from about 5 KEV. to above 100 KEV.

The present invention may be particularly useful during buildup of the plasma density since a wide variety of density, magnetic field strength, and/or temperature conditions may be progressively encountered during this phase of operation which are conducive to the stagewise generation of instabilities.

While the stabilizing feedback modulation energy has been applied to the ion beam utilized to produce the plasma in the foregoing embodiment, it will be appreciated that it will be appropriate in other circumstances to employ such a system as an accessory or to utilize an electron beam source in a similar manner. Such a circumstance would occur, for example, where a high temperature plasma is formed, in situ, without utilizing an ion source as may be the case in certain toroidal geometries.

Further details of the invention will be set forth in the following illustrative example.

EXAMPLE

A typical laboratory scale "ALICE" machine with which the invention may be practiced may have the following parameters:

| | |
|---|---|
| Fusion fuel | deuterium |
| Final plasma density $10^8$ to $10^{12}$ particles cm.³ | |
| Ion temperature | 20–40 KEV. |
| Length containment zone | 100 cm. |
| Radius containment zone | 50 cm. |
| Plasma radius | 12 cm. |
| Central Magnetic field | 5–25 kilogauss |
| Magnetic mirror fields | ~8–40 kilogauss |
| Magnetic mirror ratio | 2.0 |
| Typical high-frequency unstable oscillation mode | 8 megacycles/sec. |
| Typical low-frequency instability oscillation mode | 20 kilocycles |
| Feedback phase shift ± 90° to 270° | |

While there has been described in the foregoing what may be considered to be preferred embodiments of the invention modifications within the skill of the art may be made without departing from the teachings of the invention and it is intended to cover all such modifications as fall within the scope of the appended claims.

What we claim is:

1. In apparatus for producing and containing a high temperature plasma, the combination comprising:

means for producing a magnetic field defining a high temperature plasma containment zone in an evacuated region;

means for creating a high temperature plasma in said containment zone, said means including at least one source for directing a beam of energetic particles into said containment zone;

detector probe means disposed proximate said containment zone for detecting localized oscillatory variations in the density and position of the plasma in said containment zone and for producing a signal correlated with said oscillatory variations;

means for amplifying said signal; and means coupled to said amplifying means for coupling the amplified signal to modulate said beam of energetic particles which are directed into said containment zone so that the modulation of said beam stabilizes containment of said plasma in the containment zone defined by said magnetic field.

2. Apparatus as defined in claim 1 wherein at least said one source for directing a beam of energetic particles into said containment zone is a charged particle source and which creates a beam of energetic charged particles which is directed into said containment zone.

3. Apparatus as defined in claim 1 wherein at least said one source for directing a beam of energetic particles into the containment zone includes an ion source in combination with a neutralizer through which a beam of ions from said ion source is directed to be neutralized to form a beam of energetic neutral particles which is directed into said containment zone to be ionized and trapped therein.

4. Apparatus as defined in claim 3 wherein there is included phase shifting means operatively coupled to said probe means and delivering a signal shifted in phase to said amplifying means so that a degenerative modulation component is applied to said beam of energetic neutral particles for opposing said localized oscillatory variations in the plasma density and position.

5. Apparatus as defined in claim 4 wherein the phase shift provided by said phase shifting means is in the range of about 45° to about 315° out of phase with said oscillatory variations.

6. Apparatus as defined in claim 4 wherein the output of said signal amplifying means is applied to a solenoidal coupling coil arranged concentrically about the path of said ion beam for modulating said beam.

7. Apparatus as defined in claim 4 wherein the output of said signal amplifying means is applied to a cylindrical tubular electrode mounted concentrically about the path of said ion beam for modulating said beam.

8. Apparatus as defined in claim 6 wherein said phase shifting means shifts the phase of said signal to the range of 90° to 270° out of phase with respect to said oscillatory variations.

9. Apparatus as defined in claim 7 wherein said phase shifting means shifts the phase of said signal to the range of 90° to 270° out of phase with respect to said oscillatory variations.

10. Apparatus as defined in claim 8 wherein said magnetic field includes a locale of unfavorable line curvatures at which plasma penetration is more likely and wherein said probe means is disposed in proximity to said locale.

* * * * *